No. 638,863. Patented Dec. 12, 1899.
E. C. CHATHAM.
ROLLER BEARING.
(Application filed Apr. 13, 1899.)
(No Model.)

Witnesses,

Inventor,
Edwin C Chatham
By Dewey Strong & Co.
Atty.

UNITED STATES PATENT OFFICE.

EDWIN C. CHATHAM, OF SAN FRANCISCO, CALIFORNIA.

ROLLER-BEARING.

SPECIFICATION forming part of Letters Patent No. 638,863, dated December 12, 1899.

Application filed April 13, 1899. Serial No. 712,876. (No model.)

*To all whom it may concern:*

Be it known that I, EDWIN C. CHATHAM, a citizen of the United States, residing in the city and county of San Francisco, State of California, have invented an Improvement in Roller-Bearings; and I hereby declare the following to be a full, clear, and exact description of the same.

My invention relates to an improvement in antifriction-bearings for journals and the like.

It consists in the parts and in the constructions and combinations of parts hereinafter described and claimed.

Figure 2:
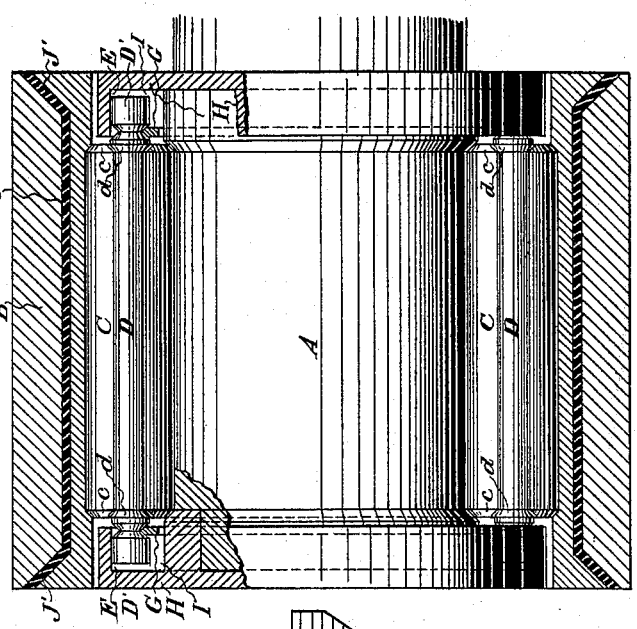
Figure 1:
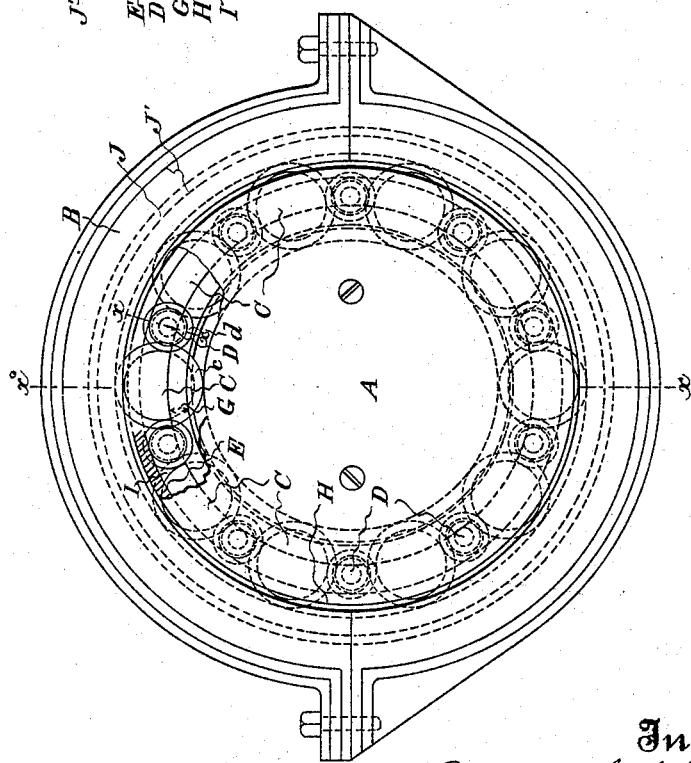

Figure 1 is an end elevation showing the track and guide-rings and the ends of the rollers, journal, and journal-box. Fig. 2 is a longitudinal section on the line $x\ x$ of Fig. 1.

The object of my invention is to provide a roller-bearing between the journal or shaft and the interior of the journal box or case within which it is revoluble, with means for compensating for expansion or contraction of the parts, and intermediate rollers with supporting rings or flanges, by which they are retained at points between and in contact with the main rollers, the proportions of the rollers and the supporting tracks or flanges being such that all contacts will be essentially rolling ones and the friction of the parts moving over one another will be reduced to a minimum.

A is a shaft or axle.

B is the journal-box, made of sufficiently larger diameter than the exterior of the shaft to admit the rollers C, which are fitted closely between the exterior diameter of the shaft or journal and the interior of the box. The proportion is also such that there will be an interspace between the adjacent rollers, and these interspaces are occupied by small rollers D, which are supported by an exterior track-surface E and an interior ring G, so disposed as to retain the rollers D at a certain distance between the journal and the interior of the box and so that they have a close rolling contact with the rollers C.

The ends of the rollers C are beveled to any suitable or desired angle, approximately forty-five degrees, as shown at $c$, and the interior of the journal-box B has its ends likewise beveled in the same manner, so that the rollers will be retained and prevented from moving outwardly. The small rollers D have a corresponding outward flare or bevel $d$, so that while the body of the rollers D contact along the bodies of the rollers C their beveled ends $d$ in like manner fit the oppositely-beveled ends $c$ of the main rollers. These rollers are thus all kept in proper line and prevented from end motion. Beyond the beveled portions of the rollers D are the extensions D', which are made of larger diameter than the bodies D. These extensions have V-shaped grooves cut in them, and these grooves travel and are supported upon interior freely-turnable rings G, the exterior diameter of which is such that they fit within the grooves in the ends D' of the rollers. Exterior to these rollers D are the caps H, either secured to or formed with the end of the axle or shaft and having the channels I formed in them, within which channels the ends D' of the rollers D project, so that the ends D' of the rollers travel in contact with the interior surface of the channels, thus forming a track to support them from the exterior, while the interior of the rollers travel upon the bearing-rings G, previously described.

The clearances between the ends of the rollers and the adjacent stationary parts and between the channeled caps H and such parts are sufficient to prevent any rubbing or frictional contact. As these rollers are all designed to move in close contact with each other, it is necessary and desirable to provide for expansion and contraction without making a loose fit within the journal-box. The journal-box is therefore shown made of an exterior and interior section, and between the two is a filling J, of felt or other material, which is sufficiently yielding to compensate for such small expansions and contractions as may occur, but sufficiently rigid, so that the box for practical purposes is as one structure. The outer ends of the inner and outer portions of the box are beveled, as shown at J', so that the intermediate filling J will have an outward bend or bevel at each end, and will thus be retained in place.

Having thus described my invention, what I claim as new, and desire to secure by Letters Patent, is—

1. A roller-bearing comprising a journal, rollers adapted to travel in contact therewith, an exterior journal-box with which the exterior of the rollers form contact, intermediate rollers contacting with the first-named rollers and having their ends projecting beyond the ends of said first-named rollers and provided with V-shaped grooves, caps fixed to the journal and having channels formed in them to receive the projecting ends of the intermediate rollers and form a track therefor, and turnable rings interior to the caps and having their outer periphery shaped to fit and engage the V-shaped grooves in the ends of the intermediate rollers.

2. In a shaft or journal bearing, a box having a cylindrical interior surface and beveled ends, a cylindrical journal of smaller diameter having ends beveled to correspond with the bevels of the box, cylindrical rollers fitting between the periphery of the journal and the interior of the box and having the ends coned to fit and correspond with the bevels of the journal and box, intermediate rollers of smaller diameter, the ends of which project beyond the ends of the main rollers, annular tracks carried by the journal having channels into which the ends of the smaller rollers project so as to roll against the interior walls of said channels, said smaller rollers having circumferential grooves near the ends, and annular rings, the peripheries of which fit and bear in said grooves whereby a rolling contact is made between the smaller rollers and the interior of the channels.

3. In a journal-bearing, a box having a cylindrical interior with converging ends, a journal of smaller diameter having the ends divergent coincident with the ends of the box, rollers fitting between the journal and the box and having the ends made cone-shaped to fit the ends of the box and journal, intermediate rollers of smaller diameter fitting between the main rollers with their ends projecting beyond and annular tracks and rings between which said projecting ends are sustained and the rollers maintained in contact with the main rollers, an exterior section of the journal-box and an intermediate filling of compressible material between the outer end sections of said box.

4. In a journal and box, the combination of a series of rollers interposed between the journal and interior of the box and forming a close contact therewith, a box having an exterior and an interior section one concentric with the other, and a filling of compressible material between the said concentric sections and serving to compensate for expansions and contractions.

In witness whereof I have hereunto set my hand.

EDWIN C. CHATHAM.

Witnesses:
  GEO. H. STRONG,
  S. H. NOURSE.